United States Patent [19]

Powrie et al.

[11] Patent Number: 4,895,729
[45] Date of Patent: Jan. 23, 1990

[54] PRESERVATION OF CUT AND SEGMENTED FRESH FRUIT PIECES

[75] Inventors: William D. Powrie, North Vancouver; Chiu R. Hui Wu, Vancouver; Brenton J. Skura, Richmond, all of Canada

[73] Assignee: University of British Columbia, Vancouver, Canada

[21] Appl. No.: 96,114

[22] Filed: Sep. 11, 1987

[30] Foreign Application Priority Data

Mar. 31, 1987 [CA] Canada ................................. 533437

[51] Int. Cl.$^4$ .......................... A23B 7/00; B65D 81/28
[52] U.S. Cl. ...................................... 426/316; 426/324; 426/333; 426/419; 426/518; 426/524
[58] Field of Search ............... 426/419, 326, 324, 316, 426/333, 320, 518, 524

[56] References Cited

U.S. PATENT DOCUMENTS

| | | | |
|---|---|---|---|
| 3,111,412 | 11/1963 | Mouk | 99/192 |
| 3,394,746 | 7/1968 | Tiegen | 426/481 |
| 3,450,542 | 6/1969 | Badran | 426/316 |
| 3,450,544 | 6/1969 | Badran et al. | 426/415 |
| 3,798,333 | 3/1974 | Cummin et al. | 426/316 |
| 4,006,257 | 2/1977 | Kolk | 426/269 |
| 4,079,152 | 9/1978 | Bedrosian et al. | 426/124 |
| 4,224,347 | 9/1980 | Woodruff | 426/316 |
| 4,409,252 | 10/1983 | Buschkens et al. | 426/316 |
| 4,411,921 | 10/1983 | Woodruff | 426/263 |
| 4,515,266 | 5/1985 | Myers | 206/205 |
| 4,711,789 | 12/1987 | Orr et al. | 426/419 |

OTHER PUBLICATIONS

Labell, *Controlled & Modified Atmosphere Packaging*, FOOD PROCESSING, Jan. 1985 at 152.
Irving, *Transport of Fresh Horticultural Produce Under Modified Atmospheres*, CSIRO FOOD RES. Q 44(2), 1984 at 25.
Saguy and Mannheim, *Cooling and Ripening of Fruit in Relation to Quality*, REFRIGERATION SCIENCE AND TECHNOLOGY, 1973 at 149.

Primary Examiner—Wilbur Bascomb
Attorney, Agent, or Firm—Chernoff, Vilhauer, McClung & Stenzel

[57] ABSTRACT

This invention is directed to a novel method of preparing and preserving fresh ripe fruit pieces so that the fruit may be stored for long periods of time without appreciable loss of natural flavour, colour and texture. A method of preparing and preserving fresh fruit for storage comprised of: (a) separating edible parenchyma tissue from inedible tissue of the fruit; (b) cutting and/or segmenting the edible parenchyma tissue of the fruit into pieces; (c) packing the fruit pieces in a high gas-barrier or gas impermeable container; (d) flushing the container with an oxygen-containing gas mixture; (e) sealing the container from ambient outer atmosphere; (f) regrigerating the container with the fruit pieces or segments at a temperature between about $-1°$ C. to about $6°$ C. to cold shock the fruit pieces in the container; and (g) storing the fruit pieces in the container at a refrigerated temperature between $-1°$ and $10°$ C.

11 Claims, No Drawings

PRESERVATION OF CUT AND SEGMENTED FRESH FRUIT PIECES

FIELD OF THE INVENTION

This invention is directed to a novel method of preparing and preserving fresh, ripe, edible fruit pieces so that the fruit may be stored for long periods of time without appreciable loss of natural flavour, colour and texture. More particularly, the method pertains to the cutting and/or segmenting of fresh edible fruit tissue into pieces, packing the fruit pieces in a high gas-barrier or gas impermeable container, gas flushing of the fruit pieces, sealing the container, cold shocking the fruit pieces, and storing the container at refrigerated temperatures.

BACKGROUND OF THE INVENTION

It is well known that the quality of whole picked fresh fruit deteriorates rapidly at ambient temperatures. The deterioration rate can be slowed, thereby enabling the fruit to be retained for longer shelf-life, when the fruit is maintained at refrigerated storage temperatures. In most cases, the shelf-life of fresh, ripe whole fruit at refrigerated temperatures (1° to 13° C.) ranges from about three days to six weeks, depending in part on fruit type. Many fruits are picked and packed in the unripe stage in order to lengthen their shelf-life at both ambient and refrigerated temperatures. Unfortunately, with this practice, the fruit frequently lacks or fails to develop optimum ripe-fruit flavour, texture and colour. Fruits harvested at the peak of ripeness possess high quality attributes which are strongly desired by consumers and thus fetch a higher price than fruit picked at the pre-ripe stage of maturity. Thus, the development or discovery of a method to capture and retain the high quality attributes of ripe fruits for prolonged storage periods would be extremely advantageous.

If all whole picked ripe fruits could be treated as one and stored under refrigeration without regard to any specific temperature requirement, then the storability and distribution of the fruits would be simple. Many types of fruits could, for example, be held in one constant temperature refrigerated room, or could be transported in one refrigerated truck at a common refrigeration temperature.

Regrettably, the situation is not that simple. Each species of whole fresh fruit must be stored within a specific custom temperature range so that acceptable quality for that particular fruit type can be retained. For example, the required storage temperature range for bananas is from 12° to 13° C. At temperatures below 12° C., chilling injury to the whole banana occurs and the edible internal tissue and the peel of the banana turn brown or black. Some other whole fruits which are also susceptible to chilling injury are mango, melon, papaya, pineapple and tomato. The chilling injury symptoms for these whole fruits are brown flesh, water-logging of flesh, surface pitting and tissue softening. As a general rule, this latter group of fruits must be stored at temperatures between 7° and 12° C. to prevent chilling injury. In comparison, recommended storage temperature ranges for raspberries, strawberries, peaches, apples and apricots are from −1° to 4° C.

In addition to a temperature factor, the composition of gases in the storage atmosphere enveloping the fruit can influence and prolong the storage life of whole fresh fruits. In particular, a moderately high level of carbon dioxide (2 to 10%) and reduced levels of oxygen (2 to 16%) in controlled atmosphere storage can significantly increase the shelf life of certain fruits such as apples, pears, strawberries and bananas. There is evidence tlat higher carbon dioxide levels and lower oxygen levels advantageously lower the respiration and ripening rates of the whole fruit. On the negative side, however, undesirable physiological disorders and deterioration in quality of the fruit may occur. Indeed, strong anaerobic off-flavour in the fruits may develop.

Apples are a fruit that can be stored successfully for several months at refrigerated temperatures in a specific gas atmosphere without experiencing a dramatic loss in quality. Controlled levels of carbon dioxide, oxygen and humidity in the atmosphere of rooms used for storing whole apples has been a technique which has been successfully used commercially for about thirty years. This procedure is commonly called controlled atmosphere storage. The carbon dioxide level is controlled to specified limits by passing the storage atmosphere gases through an alkali scrubber or hydrated lime. The oxygen is reduced and controlled by an external burner. Using these techniques, apples can be stored for about six to seven months in atmospheres of 2 to 3% carbon dioxide and 2 to 3% oxygen at temperatures around 3° C. without a dramatic downturn in quality.

It has also been determined that perishable produce such as lettuce, celery, and the like, held in transportable containers can withstand long distance transport when the containers are flushed with nitrogen and/or carbon dioxide gas to bring about low oxygen levels. Low oxygen levels have been found to reduce the respiration rate of the produce and retard deterioration. Fruit commodities require at least 1% oxygen to prevent unsightly discolouration and off-flavour development and to permit the ripening of green picked fruit.

Modified atmosphere packaging is the term commonly used for the storage of food in a flexible or semi-flexible bag or pouch with an internal atmosphere which is not controlled but may indeed vary in composition during storage of the commodity due to gas transmission through the walls of the bag or pouch. Plastic films have been used to cover whole fruits in containers so that the atmosphere enveloping the fruit can be modified. Polyethylene box liners, either sealed or unsealed, have been employed commercially for some time for the storage and transportation of apples and pears. It has been found that the respiration of the whole fruit in a sealed, air containing, polyethylene bag will cause a rise in carbon dioxide level and a corresponding reduction in oxygen content in the bag interior. If the temperature of the bagged whole fruit rises above 5° C., it has been determined that the respiration rate of the fruit increases markedly and undesirably high levels of carbon dioxide may be formed even though the polyethylene bag has comparatively high gas permeability. High levels of carbon dioxide (5% or higher) have been found to be harmful because they can cause unsightly fruit discolouration and "off-flavour" development. This is due to carbon dioxide toxicity. To reduce the risk of carbon dioxide toxicity to the whole fruit, the bags are either unsealed or perforated to permit atmosphere exchange, or packets of fresh hydrated lime (which reacts with the carbon dioxide to reduce its level) are placed in the bag prior to sealing.

Literature relating to modified atmosphere packaging of fruit and patents granted for such techniques have conventionally focussed on whole, uncut commodities. In general, these techniques are concerned with the maintenance of a suitable oxygen-containing environment around the exterior of whole fruits in plastic film packages These patented techniques and teachings require that aerobic conditions be maintained in the atmosphere enveloping the whole fruit in order to prevent the development of anaerobic or fermentation "off-flavour" in the fruit. Yet at the same time, the atmosphere must contain a sufficient amount of carbon dioxide and/or nitrogen to inhibit fruit deterioration. Some patents are concerned with the removal of some of the ethylene and carbon dioxide in the surrounding atmosphere by the inclusion of an adsorption packet of chemicals in the package prior to sealing.

In a general sense, the development of modified atmosphere packaging of fruit is in its infancy Studies have focussed on the $O_2/CO_2$ gas flushing of the packages containing whole strawberries. It has been determined that with this process, the storage life of this fruit can be lengthened by up to eight days It has also been discovered that when apples are packaged in Cryovac TM bags with a modified atmosphere (Cryovac TM is a trademark for a thermoplastic packaging film material, the shelf life of the whole apples is extended from one week to four to six weeks (LaBell, Food Processing, January, 152, 1985).

A wide variety of plastic films with different permeabilities to gases are commercially available for the modified atmosphere storage of fruits. Saguy and Mannheim (Cooling and Ripening of Fruits in Relation to Quality, Refrigeration Science and Technology, 149, 1973, Int. Inst. Refrig.) have shown that selected plastic films with various $O_2$ permeabilities can prolong the shelf life of strawberries. Marcellin (Rev Gen. Froid 64:217, 1974}discussed the use of polyethylene and a silicone membrane for the modified atmosphere storage of several fruits. It should be noted that $O_2$ transport through the plastic films ensured aerobic respiration of the fruits, yet contributed to the proliferation of aerobic microorganisms such as molds. Modified Atmosphere (MA) packaging, in the accepted sense, involves the evacuation of part or all of the air from the package and the introduction of a mixture of gases. Packages, for MA storage include pallet bags packs (CSIRO Food bag-in-bin, bag-in-box, and portion packs (CSIRO Food Res. Q. 44, 25, 1984).

In summary, controlled atmosphere storage and modified atmosphere packaging of some whole, fresh picked fruits can be used, as an adjunct to temperature control, to prolong the useful storage life for such whole fruits for a few days to a few weeks longer than is possible in non-controlled or modified conditions. Experiments have demonstrated that with some whole fruits, even controlled gas treatments have not been beneficial.

Apart from detracting from the possibility of providing premium ripe fruit and produce to meet the taste of the consumer, the lack of suitable preservation methods for fruit has the following adverse economic impact upon a nation:
1. The importation of fresh fruits into a nation represents a drain on the economic resources of that nation.
2. The potential for export of fresh fruit from one nation to another is limited because of short storage life of the fruit, thereby representing a loss in potential revenue for the nation from external sources.
3. The spoilage rates for fresh fruit are generally in the neighbourhood of 10 to 20% of the total fruit crop, thereby representing an unnecessary waste.
4. The inability to store fresh ripe fruits for long periods means that a considerable amount of fresh fruit is preserved by energy intensive, costly canning and freezing procedures.

The inventors are aware of the following references and patents which are more or less pertinent to this invention:

|  | Inventor | Issue Date |
|---|---|---|
| U.S. Pat. No. | | |
| 3,111,412 | Mouk | Nov. 19, 1963 |
| 4,001,443 | Anantray | Jan. 4, 1977 |
| 4,006,257 | Kolk | Feb. 1, 1977 |
| 4,055,931 | Myers | Nov. 1, 1977 |
| 4,079,152 | Bedrosian et al. | Mar. 14, 1978 |
| 4,235,750 | Cazalet | Nov. 25, 1980 |
| 4,331,693 | Gozdziewicz et al. | May 25, 1982 |
| 4,337,276 | Nakamura et al. | June 29, 1982 |
| 4,411,921 | Woodruff | Oct. 25, 1983 |
| 4,423,080 | Bedrosian et al. | Dec. 27, 1983 |
| 4,515,266 | Myers | May 7, 1985 |
| West German Pat. No | | |
| 2,922,145 | Kurz | Mar. 20, 1980 |
| 3,136,622 | Chekalov et al. | May 30, 1984 |
| Austrian Pat. No | | |
| 225,346 | Fetkenheue | July 31, 1985 |

Of these, the following patents brief comment on the basis that they are considered to be reasonably pertinent to the subject invention.

Mouk discloses a method of packaging perishable comestibles including fish, meat, poultry and vegetables for shipment under refrigeration. The method comprises providing a substantially rigid transportation carton, fitting within the carton a composite flexible wrapper having a continuous water resistant, moisture-vapour impermeable film lying adjacent the interior of the carton and a bonded substantially uncompressed, highly water-absorbent batt of cellulosic fibers, introducing refrigerated comestibles into the wrapper, wetting the batt with water, folding the wrapper to overlap itself and completely enclosing the comestibles and closing the carton.

According to Kolk, fruit is prepared for refrigerated storage by cutting the fruit into convenient pieces, and then subjecting the fruit to soaking under vacuum in a solution containing sodium bisulfite or sodium sulfite and citric acid in definite ranges. These ranges are preferably inversely related in a substantially straight-line relationship, so that the high end of one range is used in conjunction with the low end of the other. The fruit pieces are also preferably immersed in a preliminary holding solution containing sodium bisulfite or sodium sulfite and table salt prior to the soaking. Fruit prepared in this way can be held indefinitely under ordinary refrigeration without freezing. The process is particularly suitable for apples.

Woodruff teaches a process for inhibiting the growth of fungi on fresh whole fruits and fresh whole vegetables other than leafy and head vegetables by maintaining the surrounding gaseous atmosphere, which consisted of carbon dioxide in an amount from zero to about 20 percent by volume, molecular oxygen in an amount of about 1 percent to about 20 percent by volume, carbon monoxide in an amount of about 3 percent to about 25 percent by volume, with the remainder being substantially all molecular nitrogen, at a temperature in the range of about 29° F. to about 60° F. for a time sufficient to inhibit growth of fungi on the fresh whole fruits and fresh whole vegetables. Oxygen and carbon monoxide must be maintained in the surrounding atmosphere during the entire storage period.

Bedrosian (U.S. Pat. No. 4,423,080) discloses a controlled atmosphere package for retarding the ripening rate of fruits and vegetables. It is formed from the combination of a sealed enclosure and a packet for the package interior which contains chemical agents capable of absorbing moisture and carbon dioxide from the package environment so as to prevent mold growth or other respiratory injury to the product. Absorption of carbon dioxide and water vapour lowers the pressure inside the package and produces a driving force which allows the entry of sufficient air into the package from the surrounding ambient atmosphere to prevent anaerobic respiration and low oxygen injury to the produce.

Myers (U.S. Pat. No. 4,515,266) discloses a package for preserving whole produce in a wholesome condition for an extended period of time. The package is formed by a sealed container enveloping the produce and filled with a preservative gas (no oxygen) which inhibits bacterial growth. The container is formed by a high barrier film which is so perforated as to assure gas outflow through the perforations from the container to prevent its distortion.

SUMMARY OF THE INVENTION

This invention relates to a novel method of preparing and preserving fresh ripe fruit pieces so that the fruit may be stored for long periods without appreciable loss of natural flavour, colour and texture. The method comprises removing the edible parenchyma tissue from the inedible fruit tissue, cutting and/or segmenting the edible fruit tissue into pieces, packing the fruit pieces in a gas-impermeable or high gas-barrier container, flushing the container with an oxygen-containing gas mixture, sealing or closing the container, placing the sealed or closed container in a refrigerated room or bath at a temperature between about −1° and about 6° C., for at least twenty-four hours, and storing the container at temperatures between −1° and 10° C.

This invention is based upon the novel concepts of (1) supplying a specific amount of oxygen to the respective cells of edible parenchyma fruit pieces to produce through the Krebs enzyme cycle a sufficient amount of in situ carbon dioxide in each cell to thereby inhibit the action of ripening and respiratory enzyme systems in the cells and inhibit microbial growth in the tissue of the fresh fruit pieces, and (2) maintaining an equilibrium gas environment within the container holding the fruit pieces by choosing a container material which is gas impermeable or has high gas-barrier properties. In such a closed packaging system, uniform distribution of in situ carbon dioxide in each of the cells of the fruit pieces is ensured and transmission of outside air into the container is prevented Within a matter of hours, the oxygen level in the head space of the container starts to decrease and is reduced considerably in a few days.

Based upon current knowledge and technology, it is conceivable that fresh fruit pieces could be stored for long periods of time if (1) microbial growth is inhibited, (2) respiration and ripening rates are reduced markedly, (3) physiological disorders and chilling injury of the fruit can be prevented, and (4) the development of storage off-flavours in the fruit can be retarded.

The invention is directed to a method of preparing and preserving fresh fruit for storage which comprises: (a) separating edible parenchyma tissue from inedible tissue of the fruit; (b) cutting and/or segmenting the edible tissue of the fruit into pieces; (c) packing the fruit pieces in a high gas-barrier container; (d) flushing the container with a gas mixture containing 5 to 50% oxygen; (e) sealing the container from ambient outside atmosphere; and (f) refrigerating the container with the fruit pieces at a temperature between about −1° C. to about 6° C. (and preferably about 0° C. to about 4° C.) to cold shock the fruit pieces in the container.

According to the method, after the container and the fruit pieces are cold shocked, the container should be stored at refrigerated temperatures between about −1° C. and about 10° C.

In the method, the edible fruit tissue should be cut and/or segmented into pieces which have a large surface area to volume ratio which encourages the relatively rapid transmission of oxygen throughout and to the centre of the edible parenchyma fruit pieces. Fleshy parenchyma tissue can transmit oxygen easily compared to outer fruit skins and fruit peels which have natural gas barrier cells and coatings. By means of the Krebs enzyme cycle, in situ carbon dioxide in the cells of the edible parenchyma fruit tissue is developed in the presence of oxygen.

The invention pertains to a method of preserving fresh fruit pieces for storage and comprising exposure of the fruit to microbial growth inhibiting means and respiration and ripening rate inhibiting means. The exposure of the fruit to the microbial growth inhibiting means and respiration and ripening rate inhibiting means may be conducted so as to minimize physiological disorders and chilling injury being incurred by the fruit.

The invention also relates to a method of preserving fresh fruit pieces for storage by supplying a specified amount of oxygen to the cells of the fruit to produce a sufficient amount of in situ carbon dioxide in each cell to thereby inhibit the action of ripening and respiratory enzymes, and to inhibit microbial growth in the cells of the fruit.

In the method, the fruit may be maintained in an equilibrium gas environment. The fruit may be contained in a sealed container which is resistant to gas transmission and thereby maintains an equilibrium gas environment within the container. The equilibrium gas environment may contain about 5 to 50% carbon dioxide formed in the cells by the Krebs cycle enzymes and the balance as inert gases

DETAILED DESCRIPTION OF PREFERRED EMBODIMENTS OF THE INVENTION

Storage life of most whole, fresh picked ripe fruits is limited to short periods of time varying between two days and six weeks even when the most advanced atmosphere storage techniques are used and the fruit is held at recommended temperatures. It has been learned over the years that whole fruits are very susceptible to invasion and growth of mold and many may have occurrence of physiological disorders and chilling injury. Under all conditions above freezing, it has been found that with time, the softening of whole fruit tissues progresses at a rapid rate with an eventual loss of acceptable texture and flavour.

Based on current knowledge, it is conceivable that fresh fruit could be stored for long periods of time if (1) microbial growth in and on the fruit were inhibited, (2) respiration and ripening rates of the fruit were reduced markedly, (3) physiological disorders and chilling injury of the fruit could be prevented, and (4) the development of off-flavours could be retarded The inventors have discovered that the abovementioned criteria can be fulfilled, at least to a considerable extent, by: (1) separating edible parenchyma tissue from the inedible tissue of the whole, fresh fruit, (2) cutting and/or segmenting the edible parenchyma tissue into fruit pieces, (3) placing the fruit pieces in a gas-impermeable or high gas-barrier container, (4) flushing the container with an oxygen-containing gas mixture, (5) closing or sealing the container, and (6) placing the container holding the fruit pieces immediately into a refrigerated storage room or environment held at a temperature between about $-1°$ to about $6°$ C. (and preferably about $0°$ C. to about $4°$ C.) for at least twenty-four hours to cold shock the fruit pieces. After this treatment, the fruit pieces in the containers can be held at temperatures between about $-1°$ to about $10°$ C. for long periods of time with dramatically reduced quality deterioration rates for the fruit.

While the inventors do not wish to be bound by any theories, the following comments are provided for the purpose of enabling a better understanding of the discovery. Separating the edible tissue from the inedible tissue by coring, destoning, deseeding and pitting, and cutting and/or segmenting the edible tissue appears to provide the following advantages:

1. When edible tissue is separated physically from inedible tissue, and the edible tissue is cut, physical stress incurred in the fruit brings about changes in the metabolic processes of the fruit pieces and the disruption of membrane structures of the edible tissues. Such changes could be responsible for the inhibition or prevention of undesirable physiological disorders and chilling injury in the fruit pieces. Further, the incurred stress may bring about in the fruit pieces certain defence mechanisms against microbial growth.

2. Inedible tissues of whole fresh fruits have been found to be the prime locations for experiencing extensive physiological disorders and chilling injury in the fruit. Thus removal of the injury-vulnerable inedible tissues should provide better overall appearance and colour compared to whole fresh fruit, and thus render the marketable fruit pieces more acceptable to consumers.

3. The removal of inedible tissue from edible parenchyma tissue is believed to obviate any translocation from the inedible tissue to the edible tissue of precursors of the undesirable melanin browning reaction which is common in many fruits. Thus discolouration of the edible tissues should be minimal.

4. Cutting of the edible parenchyma tissue into pieces increases the surface area to volume ratio of the fruit and, as a consequence, it is believed that this assists the oxygen in the gas mixture of importance in the fruit preservation procedure to migrate into the centre of edible tissue pieces at a greater rate and within a shorter time period, and subsequently in situ carbon dioxide would be produced in all cells of the fruit pieces. Further, a gas equilibrium would be reached more rapidly in the edible parenchyma tissue and the surrounding environment.

In addition to the foregoing, and while, as we have said, we do not wish to be adversely bound by any theories, it is believed that the use of an oxygen-containing gas mixture for flushing the containers holding the cut fruit pieces and the use of a high gas-barrier or gas-impermeable container and the cold shocking of the fruit pieces before packaging or after gas flushing and container closing are instrumental to the success of the preservation method we have discovered. Our underlying reasons for their use and importance are presented below:

Utilizing some method of producing carbon dioxide in all of the individual cells of cut fruit pieces, in situ carbon dioxide, should be ideal because we recognize that carbon dioxide in cells retards enzymic ripening and respiration rates and microbial growth in the cut fruit pieces. Thus, the in situ carbon dioxide in each cell should reduce or retard effectively the action of ripening and respiratory enzymes in each of the tissue cells. Further, it is conceivable that in situ carbon dioxide advantageously breaks down organelle membranes of the cells and cooperates in concert with the stress factor to retard deterioration of the fruit pieces and to reduce physiological disorders and chilling injury, and to retard the enzymic anaerobic off-flavour development.

We have speculated that in situ carbon dioxide can be produced by Krebs cycle enzymes when oxygen is present in the individual cells. Since oxygen has a relatively high solubility in low temperature water ($-1°$ to $6°$ C.), transport of this gas from the surrounding atmosphere through the tissue of each cooled ($-1°$ to $6°$ C.) fruit piece into the centre would be moderately rapid It follows because of the effect of the Krebs cycle enzymes in each cell that the amount of oxygen present in the atmosphere within a package holding the cut fruit pieces should proportionally determine the concentration of in situ carbon dioxide in the individual cells of the fruit pieces.

Following this theory, the specific amount of oxygen to be transported through the tissue of the fruit pieces in a container is determined by the oxygen content of the gas mixture introduced into the container during gas flushing and the ratio of the volume of the gas atmosphere surrounding pieces in the closed container and the volume of fruit pieces in the container.

The size of the fruit pieces is important from the standpoint of the time required for oxygen to reach the centre of the pieces and generate in situ carbon dioxide. The longer the time for transport of oxygen to the centre of the fruit pieces, and subsequent conversion into in situ carbon dioxide, the greater is the possibility of tissue deterioration near the centre when in situ carbon dioxide is lacking.

We have discovered that the containers, after being filled with fruit pieces and being sealed, or closed, must be placed in a refrigerated room or bath with an air temperature of about $-1°$ to $6°$ C. (but preferably about $0°$ C. to about $4°$ C.) to cause cold shock and thereby stress the fruit tissue to further enhance defence mechanisms against tissue deterioration. These lower temperatures are also beneficial to increase water solubility of atmosphere oxygen in the fruit tissue, thereby ensuring optimum transport of the oxygen towards the centres of the fruit pieces. Further, since the solubility of carbon dioxide in water increases with a decrease in temperature, the generated in situ carbon dioxide produced in each cell should be retained to a large degree in each of the cells of the fruit pieces. This large amount of carbon dioxide in each cell would thereby effectively inhibit enzyme action in ripening and respiration, and inhibit deteriorative microbial growth in and on the tissue. Further, the low temperature of the fruit tissue would reduce enzymic rates of reactions.

Advantageously, the containers may be constructed of a non-flexible, semi-flexible or flexible material which may possess sufficient structural rigidity to enable a slight positive gas pressure in the containers. Such positive pressure could have the advantage that it would enhance carbon dioxide solubility in the cells and further assist in retarding enzyme actions.

The following discussion, examples and tabulated data explain and illustrate certain specific conditions which have been used according to the invention for the successful preservation of fruit pieces. Some fruits which we have preserved successfully as fruit pieces by the modified atmosphere packaging process of this invention include: apples, apricots, grapefruit, kiwi, mangos, melons, oranges papayas, pineapples, strawberries, tangerines and tomatoes.

It has been found that the level of ripeness of each whole fruit is a critical factor in the successful preservation of the fruit pieces by the modified atmosphere packaging process of the invention. Since the ripening of fruit pieces is retarded markedly by the modified atmosphere conditions for the packaging process of the invention, fruit for cutting and packaging should be ripened to an eating quality level. Such ripe fruit will have a characteristic fresh flavour, an optimum colouration and a firm texture. The fruit should be free of preharvest diseases, bruising and post-harvest microbial decomposition.

It has been determined that the pH of fruit pieces to be packaged under modified atmospheres must be below 4.5 to ensure safety and effective preservation of the freshness for extended storage times. At pH levels below 4.5, the activities of the ripening enzymes (polygalacturonases) are below their optimum, bacterial growth is restricted and the antimicrobial activity of carbon dioxide is high. In our studies with fruit (for example, papaya) having pH values above 4.5, a 5% citric acid solution dip or spray of fruit pieces was used to bring the pH down to values below 4.5. It was found that the diffusion of the acid into the fruit pieces occurred within a matter of hours.

Whole fruit, may be stored at temperatures between about $-1°$ to $8°$ C. prior to peeling and cutting with the benefit of reducing respiration and ripening rates and restricting ethylene production and microbial growth. For a $10°$ C. drop in temperature within the range of $0°$ and $30°$ C., it has been determined that the rate of respiration of the fruit is reduced about two to three times. For whole fruit susceptible to chilling injury, these commodities should preferably be stored between $-0°$ to $8°$ C. for a period of no longer than twenty-four hours prior to peeling and cutting to obviate quality deterioration.

The surface area to volume ratio within a specific range is also an important process requisite for successful preservation of fruit pieces under modified atmosphere packaging. For optimum results, the range of surface area to volume ratios for the fruit pieces should be between about 0.5 $cm^2/cm^3$ and 6 $cm^2/cm^3$. The higher the ratio, the shorter the time taken for the oxygen to pass to the centre of the fruit pieces. For exemplification purposes, a cored pineapple ring with a diameter of 8 cm and a thickness of 1 cm has a surface area to volume ratio of about 2.7 to 1. A pineapple bit or wedge with 1 cm thickness has a ratio of about 3.3 to 1. Generally, the weight of the fruit pieces should be between 5 and 100 grams but may be as high as 600 g.

For gas flushing of the fruit pieces in the containers, the oxygen gas is preferably introduced as a mixture with inert gases such as nitrogen, argon, helium and hydrogen. The inert gases act as bulking agents to ensure uniform distribution of oxygen throughout the container, to aid in the transport of oxygen to the centres of the fruit pieces and to prevent oxygen toxicity in the tissues. The inert gases also act as an atmosphere blanket surrounding the fruit pieces and prevent cave-in of the containers when the oxygen in the gas is converted into in situ carbon dioxide which subsequently dissolves in the water in the fruit cells and thus causes an overall atmosphere volume reduction. Further, the inert gases may act as blockers of enzyme deteriorative actions The volume of oxygen in the gas flush mixture can typically vary from 5 to 50% of the total gas volume and yet give good results. The percent volume of oxygen used in a gas flush mixture is, it has been determined, dependent on the type of fruit, fruit maturity, size of fruit pieces and the ratio of volume of gas flush mixture to the total volume of the fruit pieces. The percent volume of nitrogen in the gas flush mixture should preferably be between 50 and 95%. The percent volumes of other inert gases in the mixture will usually depend on their beneficial functional properties with each particular fruit It has been found that for optimum results, the ratio of the initial volume of the input gas flush mixture to the initial volume of fruit pieces in a closed container should be in the range of about 0.2:1 to 3:1. The higher ratio values would be used with a low percent oxygen volume in the gas mixture to produce an expanded "pillow effect" in a flexible or semiflexible package. A package with a pillow effect is one having a sufficient volume of internal inert gases to prevent or reduce fruit piece crushing by physical impact on fruit pieces contained by the package. At the same time, a sufficient amount of in-situ carbon dioxide would be produced from the oxygen in the large input gas volume to impede fresh quality deterioration.

In this invention, high gas barrier containers are essential to prevent, deteriorative inward and outward diffusion of all gases. The high gas barrier containers may typically be plastic film packages, plastic film-aluminum foil laminated packages, plastic bottles or metal cans. The high gas barrier containers must have virtually gas impermeable walls with the following maximum gas permeabilities on the basis of cubic centimeters per 100 square inches per 24 hours at $25°$ C. at 1 atmosphere: 1 for oxygen, 2 for nitrogen, 3 for carbon dioxide and 2 for other inert gases. Moisture vapour transmission rates should be below 0.5 grams per 100 sq. in. per 24 hours at $25°$ C. at 95% relative humidity.

EXAMPLE 1

Fresh whole, disease-free, intact pineapples at the firm, ripe stage and with no visible bruising and mold growth were selected. The pineapples were peeled and cored by a machine. The peeled pineapple was then sliced and cut into bits (wedges) with weights per piece ranging from 6 to 15 grams. The pieces, with a pH value of about 3.2, were placed into polyethylene/tie/ethylene vinyl alcohol/tie/polyethylene plastic laminated pouches (DuPont LP920 TM, available from DuPont Canada Ltd ) with the required high gas-barrier properties. The total weight of pineapple pieces in each pouch ranged from about 150 to 2500 grams. The air was evacuated by a vacuum-gas flush sealing unit. Each vacuumized pouch was then flushed with a gas mixture consisting of about 15 to 20% oxygen, about 3% argon and the balance nitrogen. Thereafter, the plastic pouches were sealed. The ratio of gas volume to fruit piece volume was about 0.3:1. The fruit-containing pouches were placed in a forced-air refrigerated room held at about 1° C. to cold shock the fruit pieces. The fruit pieces were stored at 1° C. for incremental periods up to three months. Analysis of headspace gases in the pouches indicated that the oxygen decreased progressively during refrigerated Notwithstanding storage times up to three months for the pineapple pieces, no spoilage causing microbial growth was evident. Visual and sensory evaluation of the pineapple pieces stored under the modified atmosphere packaging of the invention are presented in Table 1. The colour, opaqueness and firmness of the pineapple pieces were highly acceptable at the start of storage and these qualities did not change appreciably over the three month storage period. The flavour of the pineapple piece at the beginning of the storage period was considered to be highly acceptable from the standpoint of fresh pineapple odour and a desirable balance between sweetness and sourness. The flavour of the pineapple pieces stored for periods of up to two months did not recognizably change At the end of the three month storage time, the pineapple pieces were still quite acceptable, but the intensity of the pineapple flavour decreased slightly. The pineapple aroma perceived by sniffing the gas from an opened pouch was very strong at all times during the three month storage period.

EXAMPLE 2

Fresh, whole, disease-free, intact papayas at the firm, ripe stage and with no visible bruising and mold growth were selected. Each papaya, stored at 1° C. for about 24 hours, was peeled, deseeded and cut into pieces having weights ranging between 10 and 25 grams. The pH of the papaya tissue was about 5.3. The pieces were dipped into a cold 5% citric acid solution for five minutes to reduce the pH of the surface tissue to a value below 4.5. After removing the excess acid solution from the surfaces, the fruit pieces were placed into plastic (polyethylene/tie/ethylene vinyl alcohol/tie/polyethylene laminated DuPont LP920) pouches having the required high gas-barrier properties. The total weight of papaya pieces in each pouch ranged from about 150 to 2,000 grams. The air was evacuated by a vacuum gas flush sealing unit. Each vacuumized pouch was then flushed with a gas mixture consisting of 15 to 20% oxygen, 3% helium and the balance nitrogen Thereafter, the plastic pouches were sealed The ratio of gas volume to fruit piece volume was about 0.25:1. The fruit-containing pouches were placed in a forced-air refrigerated room held at about 1° C. to cold shock the fruit pieces The pH of the fruit pieces, stored for about 24 hours at 1° C., was around 4.0. The fruit pieces were stored at about 1° C. for periods up to four months.

With storage times of up to four months for the papaya pieces, no spoilage causing microbial growth was evident. Visual and sensory evaluations of the papaya pieces stored under modified atmosphere packaging are presented in Table 2. The acid dip treatment had the advantage of introducing a slight sourness to the papaya pieces and brought about a pleasant sweet-sour character. The deep yellow-orange colour, opaqueness and ripe firmness of the papaya pieces did not change appreciably over the four month storage period. The overall flavour of the papaya pieces remained at about the same sensory level throughout the four months of storage. No off-flavour was detected even after the four month storage time.

TABLE 1

Visual and Sensory Evaluation of Cut Pineapple Pieces Stored Under Modified Atmosphere Packaging

| Months of Storage at 1° C. | Colour | Opaqueness | Aroma[a] | Overall Flavour[b] | Texture | Off-Flavour[c] |
|---|---|---|---|---|---|---|
| 0 | light yellow | high | 5 | 5 | firm | 5 |
| 1 | light yellow | high | 5 | 5 | firm | 5 |
| 2 | light yellow | high | 5 | 5 | firm | 5 |
| 3 | light yellow | moderate | 4 | 4 | firm | 5 |

[a] very strong 5
strong 4
moderately strong 3
slightly strong 2
mild 1
[b] highly acceptable 5
moderately acceptable 4
slightly acceptable 3
slightly unacceptable 2
unacceptable 1
[c] none 5
very slightly 4
slight 3
moderate 2
strong 1

TABLE 2

Visual and Sensory Evaluation of a Cut Papaya Pieces Stored Under Modified Atmosphere Packaging

| Months of Storage at 1° C. | Colour | Opaqueness | Overall Flavour[a] | Texture | Off-Flavour[b] |
|---|---|---|---|---|---|
| 0 | yellow-orange | high | 5 | firm | 5 |
| 1 | yellow-orange | high | 5 | firm | 5 |
| 2 | yellow-orange | high | 5 | firm | 5 |
| 3 | yellow-orange | high | 5 | firm | 5 |
| 4 | yellow-orange | high | 5 | firm | 5 |

[a] highly acceptable 5
moderately acceptable 4
slightly acceptable 3
slightly unacceptable 2
unacceptable 1
[b] none 5
very slight 4
slight 3
moderate 2
strong 1

Table 3 illustrates typical shelf-life times of several types of sliced fruit that have been stored under Modified Atmosphere Packaging (MAP) at 1° C. according to the invention. Modified Atmosphere Packaging (MAP) applies to other types of fruit as well.

TABLE 3

|  | Sliced Fruit MAP at 1° C. (Weeks) | Whole Fruit Cold Storage[a] (Weeks) |
| --- | --- | --- |
| Mango | 12 | 2–3 |
| Pineapple | 10 | 4–5 |
| Papaya | 16 | 1–3 |
| Apricots | 10 | 2 |
| Melon | 12 | 3–4 |
| Grapefruit | 16 | 4–6 |
| Tangerine | 8 | 2–4 |
| Apple | 8 |  |

[a]Stored at an optimum refrigeration temperature for the specific fruit, Mango, pineapple, papaya, grapefruit, and tangerines at 5 to 9° 20 C.; the others at 0 to 4° C.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A method of preparing and preserving fresh fruit for storage which comprises:
   (a) separating edible parenchyma tissue from inedible tissue of the fruit;
   (b) cutting and/or segmenting the edible tissue of the fruit into pieces;
   (c) packing the fruit pieces in a gas impermeable container;
   (d) flushing the container with an oxygen containing gas mixture;
   (e) sealing the container from ambient outside atmosphere; and
   (f) refrigerating the container with the fruit pieces at a temperature between about −1° C. to about 6° C. to quickly cool the fruit pieces in the container.

2. A method as defined in claim 1 wherein after the container and the fruit pieces are quickly cooled, the container is stored at a temperature between about −1° C. and about 10° C.

3. A method as defined in claim 1 wherein the container is flushed with a gas mixture which contains between about 5 and 50% oxygen and inert gases selected from the group consisting of nitrogen, helium, argon and hydrogen.

4. A method as defined in claim 1 wherein the edible tissue is cut and/or segmented into suitably sized pieces which have a large surface area to volume ratio which allows the relatively rapid transmission of oxygen into the cells of the edible tissue, and by means of the Krebs enzyme cycle, promotes the development of in situ carbon dioxide with in the cells of the edible fruit pieces.

5. A method of preserving peeled and cut fresh fruit pieces obtained from whole fruit which comprises packing the pieces in a gas impermeable container, flushing the pieces with an oxygen containing gas, sealing the container and then quickly cooling the pieces to a temperature between about −1° and about 6° C. immediately after oxygen containing gas flushing and container sealing.

6. A method as defined in claim 5 wherein the pH of the fruit pieces is less than 4.5.

7. A method as defined in claim 5 wherein the whole fruit is stored at temperatures between about −1° to 8° C. before the whole fruit is peeled and cut into fruit pieces.

8. A method as defined in claim 5 wherein the ratio range of surface area to volume of the fruit pieces is between about 0.5 $cm^2/cm^3$ to about 6 $cm^2/cm^3$.

9. A method as defined in claim 5 wherein the oxygen containing gas has a nitrogen volume content between about 50 and 95%.

10. A method as defined in claim 5 wherein the ratio of oxygen containing gas volume to fruit pieces volume in the closed container is between about 0.2:1 to about 3:1.

11. A method as defined in claim 1 or 5 wherein the fresh fruit pieces are quickly cooled at temperatures between about 0° C. and about 4° C.

* * * * *